United States Patent
Tene et al.

(10) Patent No.: US 7,260,139 B2
(45) Date of Patent: Aug. 21, 2007

(54) METHOD TO REDUCE THE NUMBER OF BITS PER SOFT BIT

(75) Inventors: Eitan Tene, Tel-Aviv (IL); Dotan Sokolov, Ra'anana (IL)

(73) Assignee: Intel Corporation, Santa Clara, CA (US)

(*) Notice: Subject to any disclaimer, the term of this patent is extended or adjusted under 35 U.S.C. 154(b) by 820 days.

(21) Appl. No.: 10/274,916

(22) Filed: Oct. 22, 2002

(65) Prior Publication Data

US 2004/0076184 A1    Apr. 22, 2004

(51) Int. Cl.
H04B 1/00    (2006.01)

(52) U.S. Cl. .................................................. 375/148
(58) Field of Classification Search ................ 375/136, 375/144, 148, 162, 341, 346, 347, 348, 349
See application file for complete search history.

(56) References Cited

U.S. PATENT DOCUMENTS

| | | | |
|---|---|---|---|
| 5,442,627 A | 8/1995 | Viterbi et al. | |
| 5,809,089 A | 9/1998 | Vasic | |
| 6,615,386 B2* | 9/2003 | Yano et al. | 714/780 |
| 2002/0018527 A1* | 2/2002 | Vanderaar et al. | 375/259 |
| 2002/0067780 A1* | 6/2002 | Razzell | 375/341 |
| 2002/0154704 A1* | 10/2002 | Reshef | 375/262 |
| 2002/0181432 A1* | 12/2002 | Wang et al. | 370/342 |
| 2004/0203987 A1* | 10/2004 | Butala | 455/522 |

OTHER PUBLICATIONS

Tan et al., "Soft-Decisions in Multistage RAKE Receiver in 3GPP implementation", Military Communications Conference, Milcom 2002 Proceedings, Anaheim CA Oct. 7-10, 2002, IEEE Military Communications Conference, New York, NY, IEEE US vol. 1 of 2, Oct. 2002, pp. 1344-1349.

Lee et al., "Normalization, Windowing and Quantization of Soft-Decision Viterbi Decoder Inputs in CDMA Systems", Vehicular Technology Conference, 1999, IEEE US, pp. 221-225.

\* cited by examiner

*Primary Examiner*—Khanh Tran
*Assistant Examiner*—Sam Ahn
(74) *Attorney, Agent, or Firm*—Pearl Cohen Zedek Latzer, LLP

(57) ABSTRACT

A method and apparatus for reducing an amount of bits of data at at least two stages of data transfer in a communications reception data path between a rake receiver and a channel decoder.

21 Claims, 4 Drawing Sheets

METHOD TO REDUCE THE NUMBER OF BITS PER SOFT BIT

BACKGROUND OF THE INVENTION

A code division multiple access (CDMA) or a wide-band CDMA (WBCDMA) receiver may comprise a rake receiver, which may include multiple receiving elements, called fingers, which de-spread a received signal. A rake combiner may receive data or information from the fingers to form soft bits, which may then be stored in memory for processing.

The transfer of information in the reception path, after the rake combiner, may comprise processing bits. Along a reception data path in a WBCDMA system, for example, different processing techniques may be performed. For example, the data transmitted may be rearranged to a random order by one or more interleavers. Accordingly, at some point in the reception path, the reception data may be reordered to the correct, original order by using one or more deinterleavers. Frames and blocks of data may be formed and the data may be processed by different processing techniques, such as but not limited to, channel decoding.

The number of bits associated with the data (soft bits) at the rake combiner may be some large number n. The large number of bits may be required for data precision and dynamic range during the different processing procedures. However, processing a large number of bits may be costly and time-consuming in terms of data management, memory storage, and processing hardware and software, for example.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
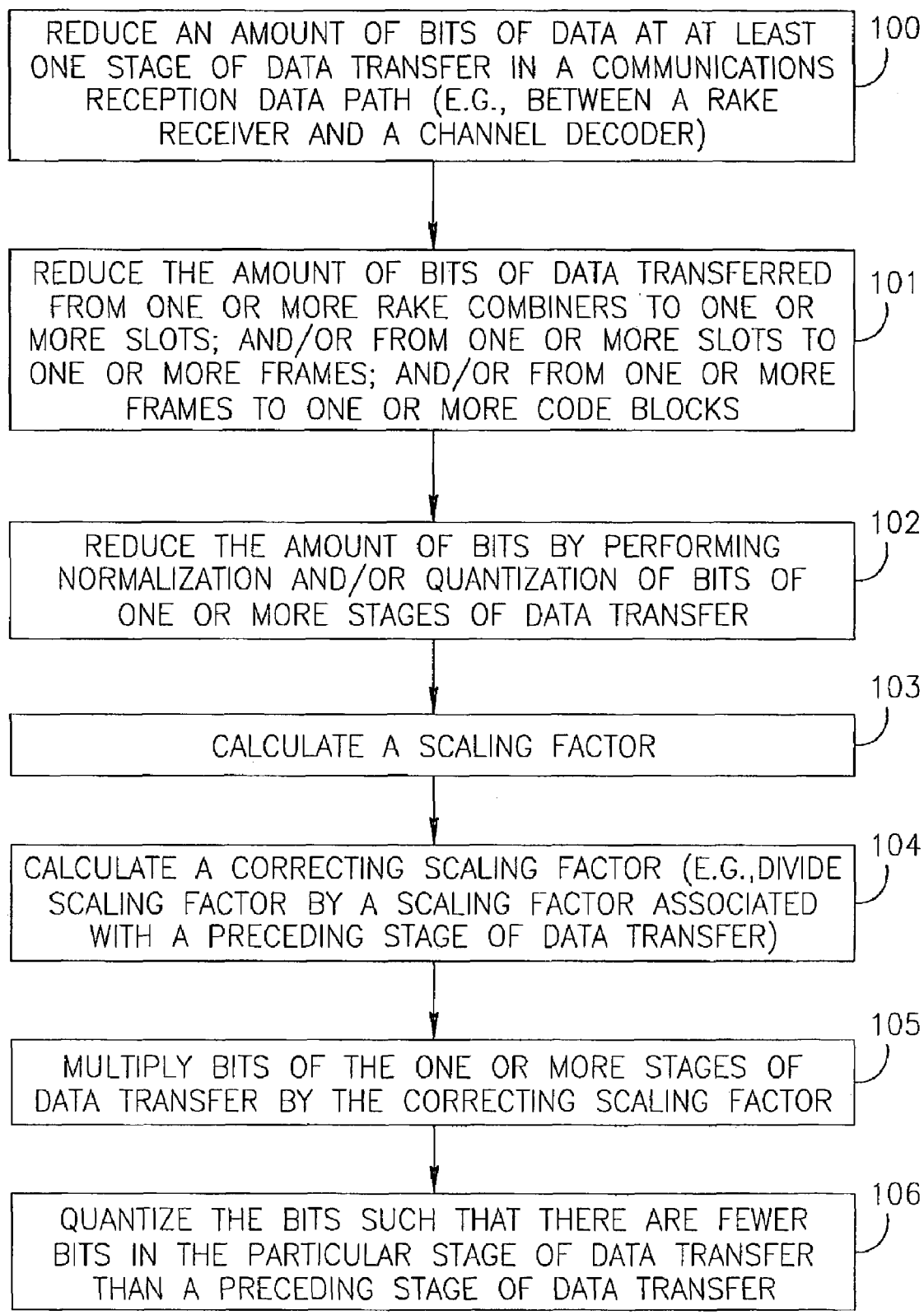
FIG. 1 is a simplified flow chart of a method for reducing an amount of bits of data at one or more stages of data transfer in a communications reception data path, in accordance with an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

Figure 4:
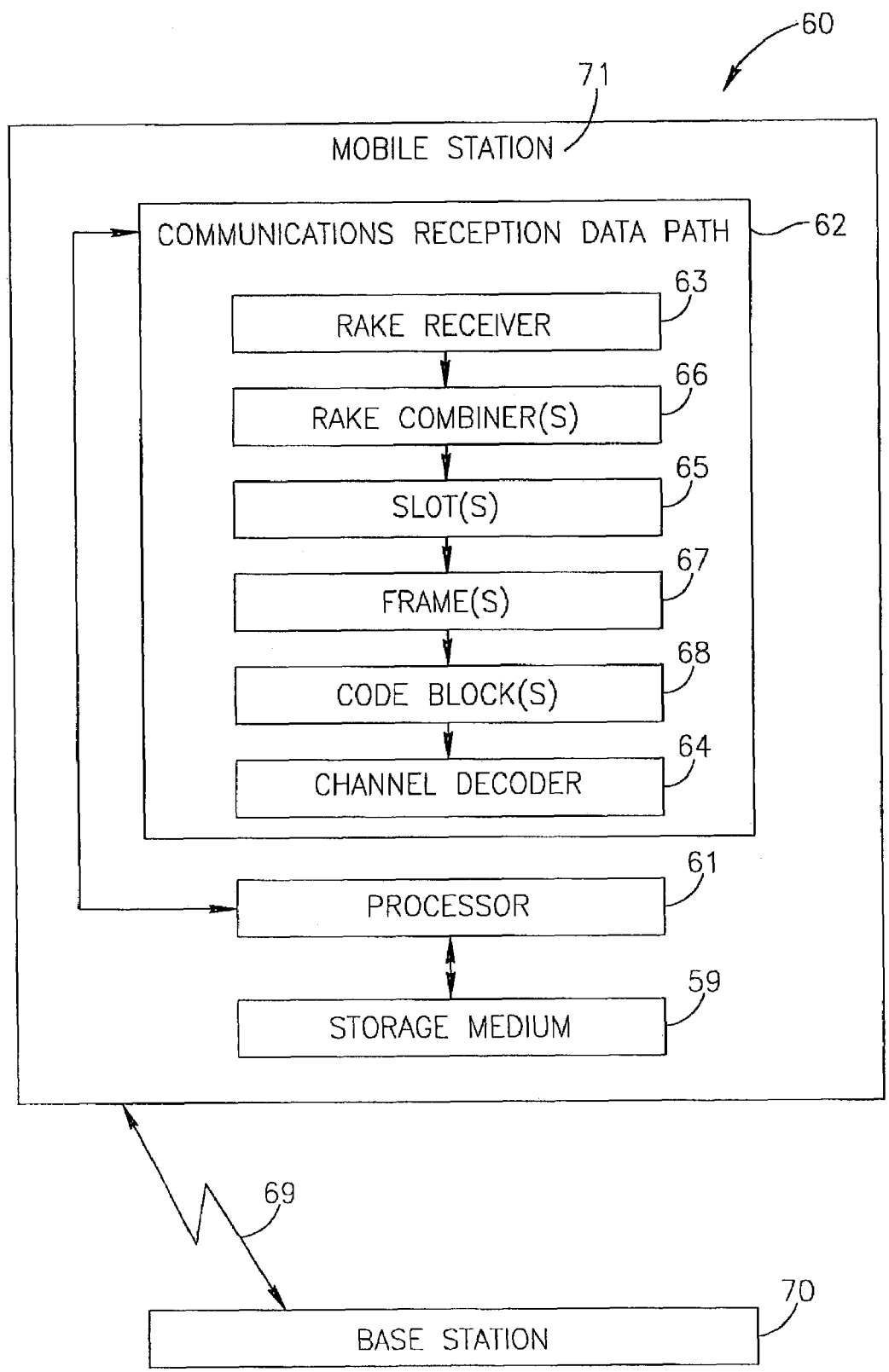
FIG. 4 is a simplified block diagram of a communications system wherein bits of data are reduced at different stages of data transfer in a communications reception data path, in accordance with an embodiment of the invention.

Reference is now made to FIG. 4, which illustrates a communications system 60, in accordance with an embodiment of the invention. Communications system 60 may comprise a base station 70 and a mobile station 71 communicable with one another via a wireless link 69 in accordance with a mutual protocol, such as but not limited to, code division multiple access (CDMA), wideband CDMA (WCDMA) or CDMA2000. Mobile station 71 may comprise a processor 61 adapted to reduce an amount of bits of data at one or more stages of data transfer in a communications reception data path 62. Examples of methods for reducing the amount of bits of data (soft bits), which methods may be implemented by processor 61, are described hereinbelow. A storage medium 59, such as but not limited to, a volatile or non-volatile memory array, e.g., a flash memory, read-only memory (ROM), or electrically erasable read-only memory (EEPROM), may be provided for storing instructions that enable processor 61 to reduce the amount of bits of data in communications reception data path 62.

The following description is for the example of a communications system comprising base station 70 and mobile station 71, where mobile station 71 comprises storage medium 59, processor 61 and communications data path 62 and processor 61 implements methods according to some embodiments of the invention. However, it will be appreciated that some embodiments of the invention are equally applicable to a communications system comprising a mobile station and a base station, where it is the base station that comprises storage medium 59, processor 61 and communications data path 62.

The communications reception data path 62 may comprise, without limitation, a data path between a rake receiver 63 and a channel decoder 64. The data may be collected into different size groups along the communications reception data path 62. For example, the data output from one or more rake combiners 66 may be collected into one or more slots 65. The data from the one or more slots 65 may be collected into one or more frames 67. The data from the one or more frames 67 may be collected into one or more code blocks 68. The size of the group of data may increase from one stage to a subsequent stage. For example, the size of code block 68 may be larger than the size of frame 67 and the size of frame 67 may be larger than the size of slot 65.

Processor 61 may comprise a separate unit in communication with any of the components of communications reception data path 62. Alternatively, processor 61 may comprise therewithin some or all of the components of communications reception data path 62. Still alternatively, any of the components of communications reception data path 62 may comprise therewithin portions or all of processor 61.

Reference is now made to FIG. 1, which illustrates a method for reducing an amount of bits of data (also referred to as soft bits) at one or more stages of data transfer in a communications reception data path, in accordance with an embodiment of the invention. The method may be implemented by system 60 of FIG. 4. The amount of bits of data (soft bits) may be reduced at one, two or more stages of the data transfer (e.g., reception), for example, in the communications reception data path (e.g., between rake receiver 63 and channel decoder 64 of FIG. 4), as indicated at reference numeral 100 in FIG. 1. The method may reduce the amount of bits transferred from one or more rake combiners 66 to one or more slots 66, and/or to one or more frames 67, and/or to one or more code blocks 68 (reference numeral 101). Accordingly, the method may comprise collecting bits of data into groups of data at one or two or more stages of data transfer in the communications reception data path, wherein the group of data increases in size from one stage to a subsequent stage (e.g., from slots to frames to code blocks), and reducing an amount of the bits of data at one or more stages of data transfer in the communications reception data path.

The reducing may comprise performing normalization and/or quantization of bits of one or more stages of data transfer (reference numeral 102). As will be described more in detail with reference to FIG. 2, the method of reducing the number of bits may comprise calculating a scaling factor (reference numeral 103), and may also comprise calculating a correcting scaling factor (reference numeral 104). The correcting scaling factor may comprise dividing the scaling factor of the current stage of data transfer by one or more scaling factors associated with a preceding stage of data transfer reception. The bits of the stages of data transfer may then be multiplied by the correcting scaling factor (reference numeral 105) per slot. The data in the current stage may not all be necessarily multiplied by the same correcting scaling factor. The bits may then be quantized (reduced in number) such that there are fewer bits in the particular stage of data transfer than a preceding stage of data transfer (reference numeral 106).

Figure 2:
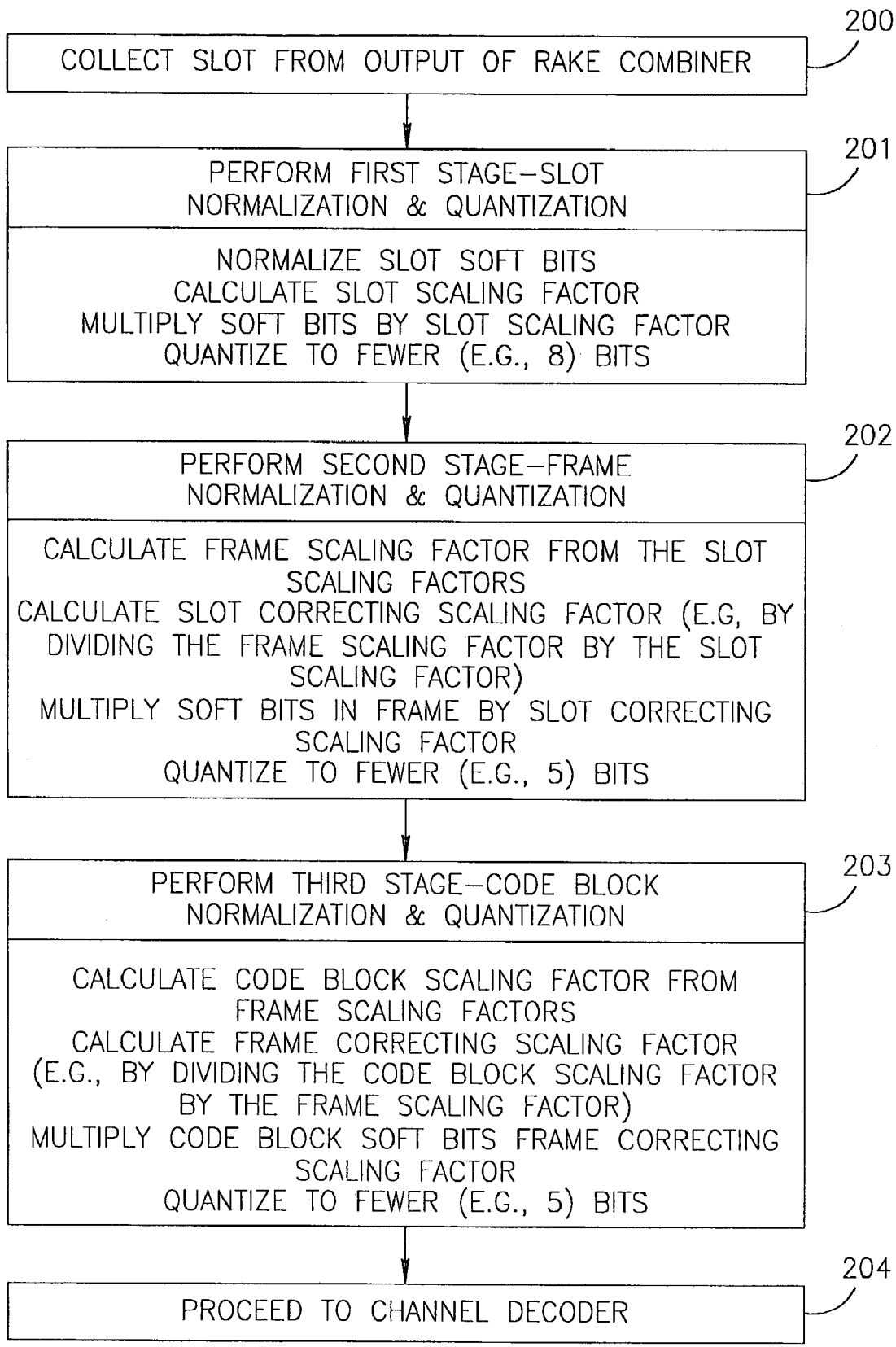
FIG. 2 is a simplified flow chart of an example of the method of FIG. 1, used with a communications reception data path that may comprise slots, frames and code blocks, in accordance with an embodiment of the invention.
Figure 3:
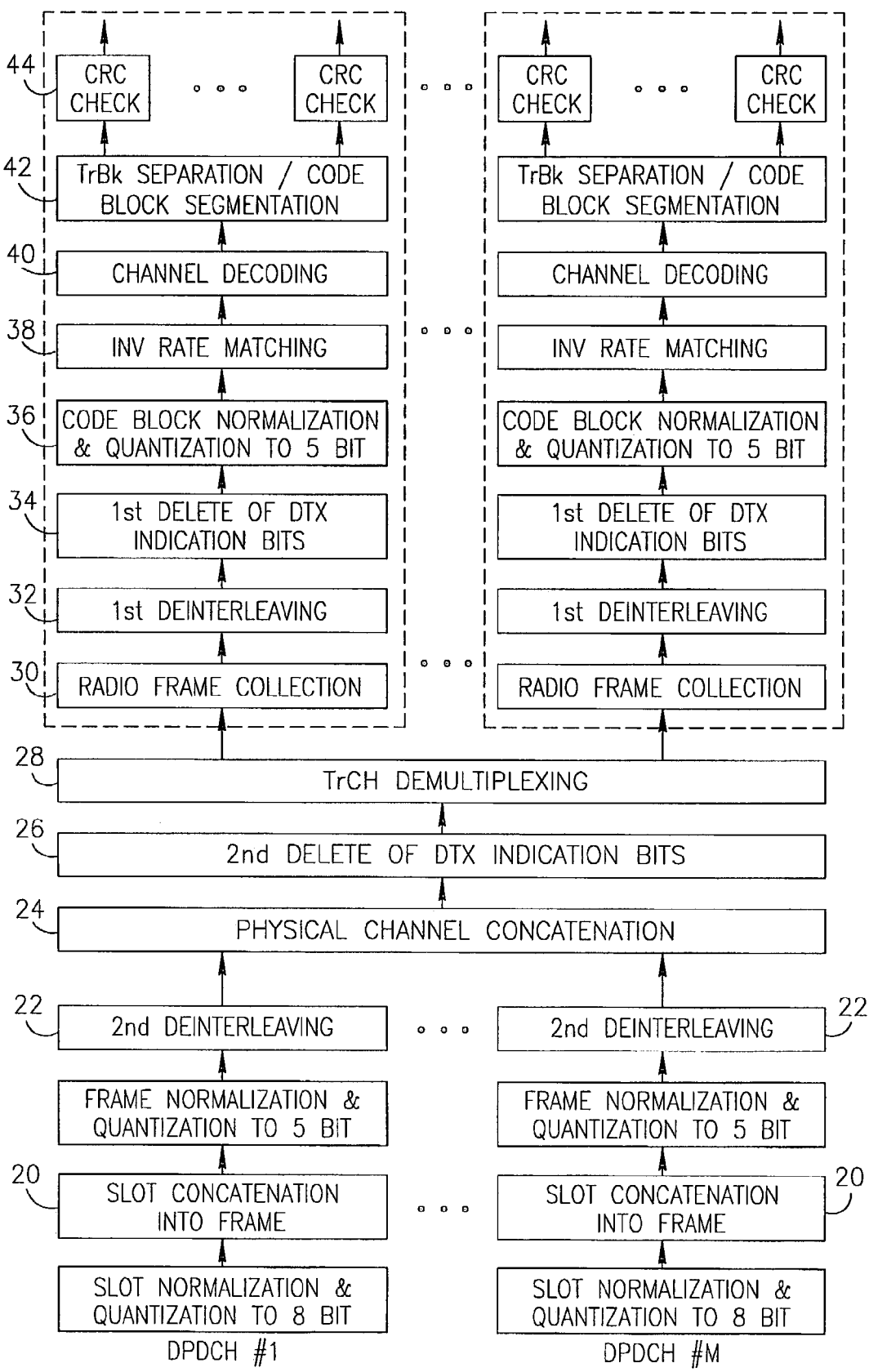
FIG. 3 is a simplified block diagram of an apparatus wherein bits of data are reduced at different stages of data transfer in a communications reception data path, corresponding to the exemplary embodiment of FIG. 2, in accordance with an embodiment of the invention.

Reference is now made to FIG. 2, which illustrates an example of the, method of FIG. 1, which may be implemented in the communications reception data path 62 shown in FIG. 4, in accordance with an embodiment of the invention. FIG. 3 is a simplified block diagram of elements of communications reception data path 62 and of elements which processor 61 may comprise to reduce the amount of bits of data at one or more stages of data transfer in communications reception data path 62.

Slots 65 (FIG. 4) may be collected from the output of rake combiner or combiners 66 (reference numeral 200, FIG. 2). The number of bits in the soft bits of the rake combiner 66 may be 16, for example, although the present invention is not limited to this value.

In a first stage, the slot 65 may be normalized and/or quantized (reference numeral 201). Examples of normalization techniques and methods of calculating scaling factors are described more in detail further hereinbelow.

The normalization of the slot soft bits may comprise, without limitation, calculation of a slot scaling factor, multiplication of the slot soft bits by the slot scaling factor, followed by quantization of the soft bits to a number of bits fewer than the bits of the rake combiner. The number of bits in the soft bits of the slots may be 8, for example, although the present invention is not limited to this value.

As seen in FIG. 3, the communications system may comprise, for example, M channels, and for each channel, the number of bits in the slots may be reduced as described above. The data in the slots may be concatenated and transferred to frames (reference numeral 20 in FIG. 3).

Referring again to FIG. 2, in a second stage of reducing the number of bits, the frames may be normalized and/or quantized (reference numeral 202). A frame scaling factor may be calculated from the slot scaling factors (calculated from the input root-mean-square (RMS) values of the slots). A slot correcting scaling factor may then be calculated for one or more of the slots combining the frame. For example, the slot correcting scaling factor may be calculated by dividing the frame scaling factor by the slot scaling factor. The soft bits in the frame may then be multiplied by the slot correcting scaling factor of the particular slot. In other words, a soft bit in the frame may be connected to the slot it came from and multiplied by that slot's slot correcting scaling factor. The soft bits of the frames may then be quantized to a number of bits fewer than the bits of the slots. The number of bits in the soft bits of the frames may be 5, for example, although the present invention is not limited to this value.

As seen in FIG. 3, after the frame normalization and quantization, the data may be deinterleaved, wherein the order of the bits may be changed (reference numeral 22). This may be followed by various processing procedures, such as but not limited to, physical channel concatenation 24, deleting 26 of DTX (discontinuous transmission) indication bits, and channel demultiplexing 28. Then for individual channels, there may be further processing procedures, such as but not limited to, radio frame collection 30, deinterleaving 32, wherein the order of the bits may be changed, and deleting 34 of DTX indication bits. The data may then be transferred to code blocks (reference numeral 36).

Referring again to FIG. 2, in a third stage of reducing the number of bits, the code blocks may be normalized and/or quantized (reference numeral 203). A code block scaling factor may be calculated from the frame scaling factors (e.g., calculated from the frames RMS). A frame correcting scaling factor may then be calculated for one or more of the frames in the code block. For example, the frame correcting scaling factor may be calculated by dividing the code block scaling factor by one or more of the frame scaling factors. The soft bits in the code block may then be multiplied by the frame correcting scaling factor of the particular frame, wherein the soft bit may be multiplied by the correcting scaling factor from its own frame. The frame correcting scaling factors may be taken in a cyclic order while multiplying them with the code block soft bits The soft bits of the code blocks may then be quantized to a number of bits fewer than or equal to the bits of the frames. Soft bits from different frames may be placed in the same level of reference.

The bits of the code blocks may then undergo further processing, as seen in FIG. 3. The processing may comprise, without limitation, inverse rate matching 38, channel decoding 40 (reference numeral 204 in FIG. 2), track block separation and/or code block segmentation 42, and CRC (cyclic redundancy checking) 44.

With the present invention, it may be possible to store two or three or more soft bits within one word, for example, although the invention is not limited to these values.

Different normalization techniques may be used to carry out the invention. The following are some illustrative examples, but the invention is not limited to these examples.

The normalization may be divided into calculating the scaling factor and normalizing over the input soft bits. The scaling factor may be calculated from the input soft bits and from the scaling factors of the previous stage.

Calculating the scaling factor from the input data bits may be performed as follows:

$$\text{Input\_RMS} = \sqrt{\frac{\sum_{i=0}^{N-1}(InputSB[i])^2}{N}};$$

N is the number of soft bits in the input.

$$\text{scaling\_factor} = \frac{\text{Desired\_RMS}}{\text{Input\_RMS}};$$

Desired RMS may be constant, for example, 0.5.

This calculation may be done in the slot normalization mentioned hereinabove.

Calculating the scaling factor from the previous stage may be done by using a max/min algorithm as follows:

First pass:

$$\text{Input\_RMS} = \sqrt{\frac{\sum \text{RMS\_In}[k]^2}{M}};$$

M is the number of elements from the previous stage (for example, the number of slots in a frame in the frame normalization and quantization stage, or the number of TTI (transmission time intervals) in the code block normalization and quantization stage.)

RMS In[k] is the Input RMS of the k slot in the frame normalization and quantization stage or the k frame in the code block normalization and quantization stage.

$$MaxRMS = \max_{k \in \{0, \ldots, M-1\}} \left( \text{RMS\_In}[k] \right);$$

$$MinRMS = \min_{k \in \{0, \ldots, M-1\}} \left( \text{RMS\_In}[k] \right); \text{if} \left(\frac{MaxRMS}{MinRMS} > Max2MinRatio\right)$$

Second pass:

$$\text{Input\_RMS} = \sqrt{\frac{\sum \text{RMS\_In}[k]^2}{L}};$$

for every k such that RMS_In[k] <Input_RMS*Threshold;

L is the number of k for which the equation is true.

Threshold may be constant, for example, 1.3. Tile Threshold may be used to multiply the Input RMS calculated in the first pass.

Max2MinRatio may be constant, for example, 7.

This point of the calculation may be reached either from the second pass or from the first pass if no second pass was performed.

$$\text{scaling\_factor} = \frac{\text{Desired\_RMS}}{\text{Input\_RMS}};$$

$$\text{Correct\_scaling\_factor}[k] = \frac{\text{scaling\_factor}}{SF[k]} \forall k \in \{0, \ldots, M-1\};$$

SF[k] is the scaling factor of the k slot in the frame normalization and quantization stage or the k frame in the code block normalization and quantization stage.

The second pass may be performed in the frame normalization. In the code block normalization, this algorithm may be performed without the second pass.

One purpose of the second pass in the max/min algorithm may be to detect a case where there may be a large difference between powerful soft bits and weak soft bits. This may give more weight to the weak soft bits. This may be done in the flame normalization and quantization stage while taking the RMS of the slots as a measurement for the mean strength of the soft bits in the slot.

This normalization may comprise the following:

Slot normalization: NormalizedSB[i]=InputSB[i]
*scaling_factor; ∀i∈{0, . . . , N−1}.

Frame normalization:
For (j=0; j<SlotsInFrame; j++)
For (l=0; l<SBinSlot; l++)

NormalizedSB[j,l]=InputSB[j,l]*correcting_
scaling_factor[j]

The slots may be arranged in sequential order in the frame before the second deinterleaver (reference numeral 22 in FIG. 3).

The code block normalization may comprise the following:

j=0
For (l=0; l<SBinCodeBlock; l++)

NormalizedSB[l]=InputSB[l]*correcting_scaling_factor[j]j=(j+1)modTTI

The frames in the code block frame may be mixed after the 1$^{st}$ deinterleaver (reference numeral 32 in FIG. 3). The order may be that the 1$^{st}$ soft bit may be from frame #0, the 2$^{nd}$ soft bit may be from frame #1, the 3$^{rd}$ soft bit may be from frame #2 and so on. The order of the frames may be comprise the inter column permutation pattern in the 1$^{st}$ deinterleaver.

A summary of the normalization and quantization flow may be as follows: p0 Slots:

$$RMS_{Slot}[k] = \sqrt{\frac{\sum SB[j]^2}{N}} \quad SF_{Slot}[k] = \frac{\text{Desired\_RMS}_{Slot}}{RMS_{Slot}[k]}$$

Frames:

$$RMS_{Frame}[l] = \sqrt{\frac{\sum_k RMS_{Slot}[k]^2}{M}}$$

Calculating may use two passes (first pass and second pass). M is the number of slots for which $RMS_{Slot}[k] < RMS_{Frame}[l]*Threshold$, where $RMS_{Frame}[l]$ was calculated in the first pass.

$$SF_{Frame}[l] = \frac{Desired\_RMS_{Frame}}{RMS_{Frame}[l]}$$

$$CorrectingSF_{Slot}[k] = \frac{SF_{Frame}[l]}{SF_{Slot}[k]}$$

BlockCode:

$$RMS_{CodeBlock} = \sqrt{\frac{\sum_l RMS_{Frame}[l]^2}{TTI}}$$

$$SF_{CodeBlock} = \frac{Desired\_RMS_{CodeBlock}}{RMS_{CodeBlock}}$$

$$CorrectingSF_{Frame}[l] = \frac{SF_{CodeBlock}}{SF_{Slot}[l]}$$

Different quantization techniques may be used to carry out the invention. The following are some illustrative examples, but the invention is not limited to these examples.

The quantization may be performed using quantization levels, which comprise a nonsymmetrical uniform sequence including zero. For example, quantization levels for 3 bits may be: {−4, −3, −2, −1, 0, 1, 2, 3}. The quantization limits may comprise the following:

NumOfLevels=$2^{NumOfQuanBits}$ $$QuanStep = \frac{2}{NumOfLevels}$$

QuanLimits[k]=−1+(k+0.5)*QuanStep

In the example of 3 bits, the quantization limits may be: {−0.875, −0.625, −0.375, −0.125, 0.125, 0.375, 0.625, 0.875}.

The quantization may be done in the following way:

The quantization level k QuanLevel[k] may be taken for the normalized bit j NormBit[j] if:

(NormBit[j]<QuanLimit[k]) and (NormBit[j]>QuanLimit[k−1]) with the exceptions

QuanLevel[1] may be taken if NormBit[j]<QuanLimit[1] and

QuanLevel[NumOfLevels] may be taken if NormBit[j]>QuanLimit[NumOfLevels−1].

The quantization in the slot quantization may comprise a reduction to 8 bits, in the frame quantization to 5 bits and in the block code quantization to 5 bits, the invention not being limited to these values.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method of receiving and transferring data comprising:
    receiving, by a communications reception data path between a rake receiver and a channel decoder, soft bits having a first amount of bits per each soft bit;
    collecting the soft bits into first groups;
    performing a first stage of normalization and quantization on the soft bits within each of the first groups to reduce the number of bits in each of the soft bits;
    collecting the first groups into second group; and
    performing a second stage of normalization and quantization on the soft bits within the second group to further reduce the number of bits in of the soft bits.

2. The method according to claim 1 further comprising:
    collecting a plurality of second groups into a third group; and
    performing a third stage of normalization and quantization on the soft bits within the third group.

3. The method according to claim 2, wherein collecting the second groups into the third group comprises collecting frames into a code block.

4. The method according to claim 2, wherein said performing the third stage at normalization comprises calculating of third scaling factor.

5. The method according to claim 1, wherein collecting the first groups into the second group comprises collecting slots into a frame.

6. The method according to claim 1, wherein said performing the first stage of normalization comprises calculating a first scaling factor.

7. The method according to claim 1, wherein said performing the second stage of normalization comprises calculating a second scaling factor.

8. The method according to claim 7, wherein said performing the second stage of normalization and comprises calculating a correcting scaling factor.

9. The method according to claim 8, wherein calculating said correcting scaling factor comprises dividing said second scaling factor by said first scaling factor.

10. The method according to claim 8, further comprising multiplying one or more of said soft bits by said correcting scaling factor.

11. The method according to claim 7, wherein said performing the second stage of normalization comprises normalizing said soft bits by calculating said second scaling factor as a root-mean-square function of said soft bits.

12. The method according to claim 1, wherein said performing the quantization comprises quantizing the bits in each of said soft bits such that there are fewer bits in each soft bit after the second stage than in each soft bit after the first stage.

13. The method according to claim 1, further comprising concatenating data transferred from said first stage to said second stage.

14. The method according to claim 1, further comprising deinterleaving data transferred from said first stage to said second stage.

15. Apparatus for processing data in a communications reception data path, the apparatus comprising:
    a processor operatively coupled to said communications reception data path between a rake receiver and a channel decoder, to receive soft bits;

to collect the soft bits into first groups;

to perform a first stage of normalization and quantization on the soft bits within each of the first groups to reduce the number of bits in each of the soft bits;

to collect the first groups into a second group; and to perform a second stage of normalization and quantization on the soft bits within the second group to further reduce the number of bits in each of the soft bits.

16. The apparatus according to claim 15, wherein said processor is to collect a plurality of second groups into a third group and to perform a third stage of normalization and quantization on the soft bits within the third group.

17. A communications system comprising:

a communications reception data path comprising a rake receiver and a channel decoder;

a processor, to receive soft bits;

to collect the soft bits into first groups;

to perform a first stage of normalization and quantization on the soft bits within each of the first groups to reduce the number of bits in each of the soft bits;

to collect the first groups into a second groups; and to perform a second stage of normalization and quantization on the soft bits within the second group to further reduce the number of bits in each of the soft bits; and a flash memory coupled to said processor, to store one or more instructions executable by said processor.

18. The system according to claim 17, wherein said processor is to collect a plurality of second groups into a third group and to perform a third stage of normalization and quantization on the soft bits within the third group.

19. The system according to claim 17, wherein said processor is to quantized the bits in each of said soft bits such that there are fewer bits in each soft bit after the second stage than in each soft bit after the first stage.

20. A computer-readable medium having instructions stored thereon, which, when executed by a computer, result in:

receiving, by a communications reception data path between a rake receiver and a channel decoder, soft bits having a first amount of bits per each soft bit;

collecting the soft bits into first groups;

performing a first stage of normalization and quantization on the soft bits within each of the first groups to reduce the number of bits in each of the soft bits;

collecting the first groups into a second groups; and a second stage of normalization and quantization on the soft bits within performing the second group to further reduce the number of bits in each of the soft bits.

21. The computer-readable medium according to claim 20, wherein said instructions further result in:

collecting a plurality of second groups into a third group; and performing third stage of normalization and quantization on the soft bits within the third group.

* * * * *